(No Model.)  4 Sheets—Sheet 2.
W. H. SAWYER.
STRIKE SYSTEM FOR SECONDARY ELECTRIC CLOCKS.
No. 295,287. Patented Mar. 18, 1884.
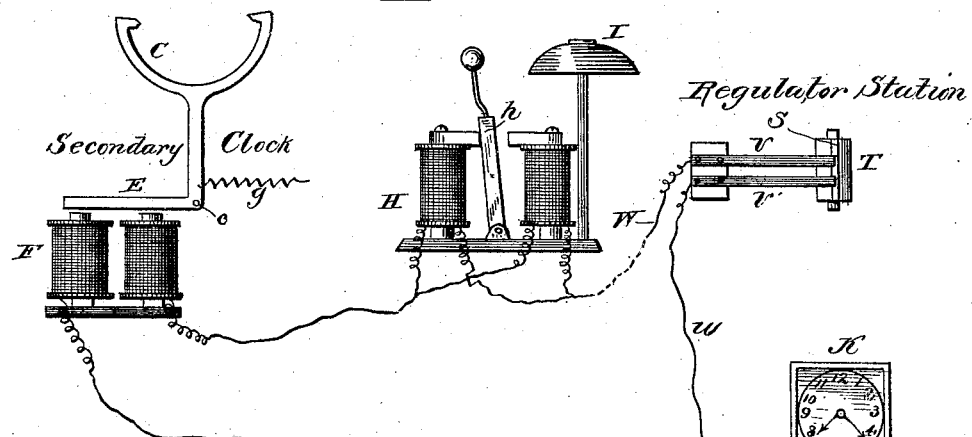
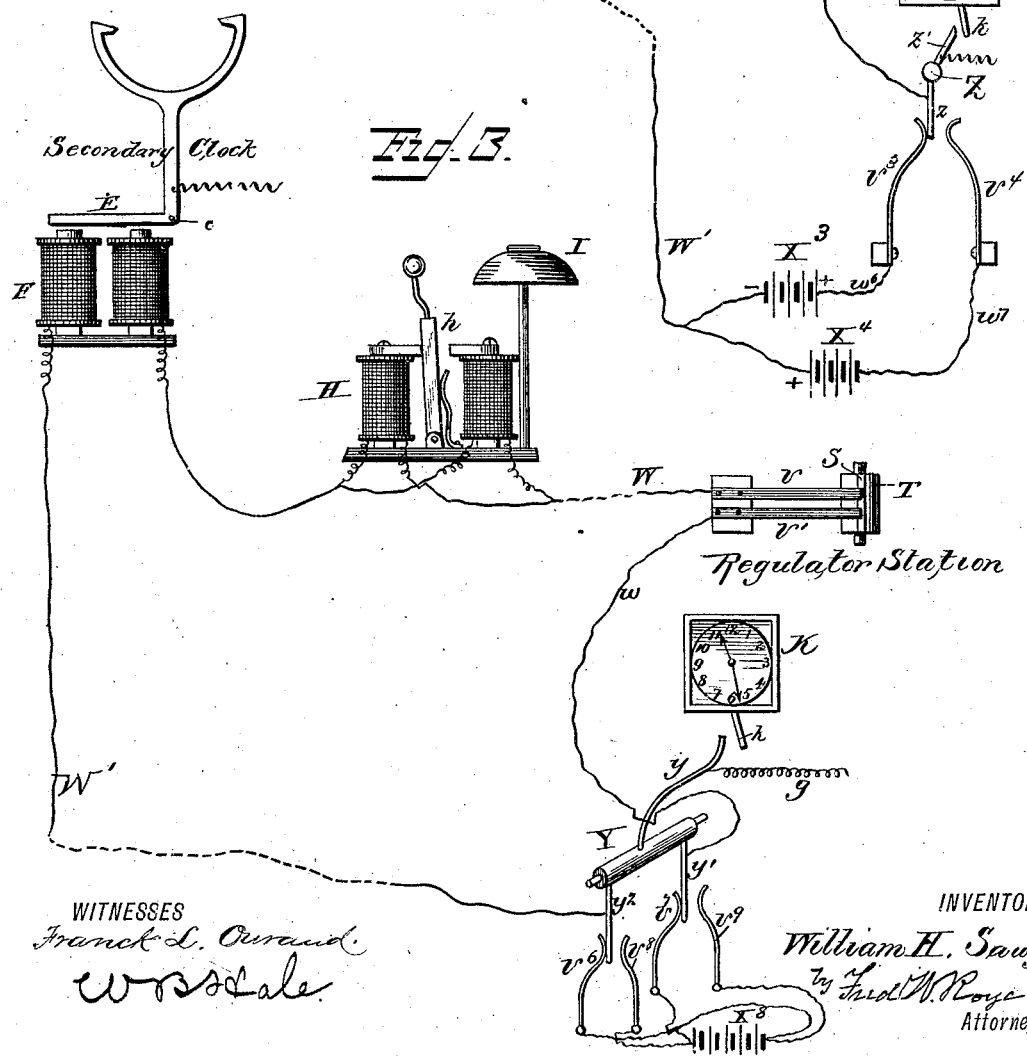
WITNESSES
INVENTOR
William H. Sawyer
Attorney

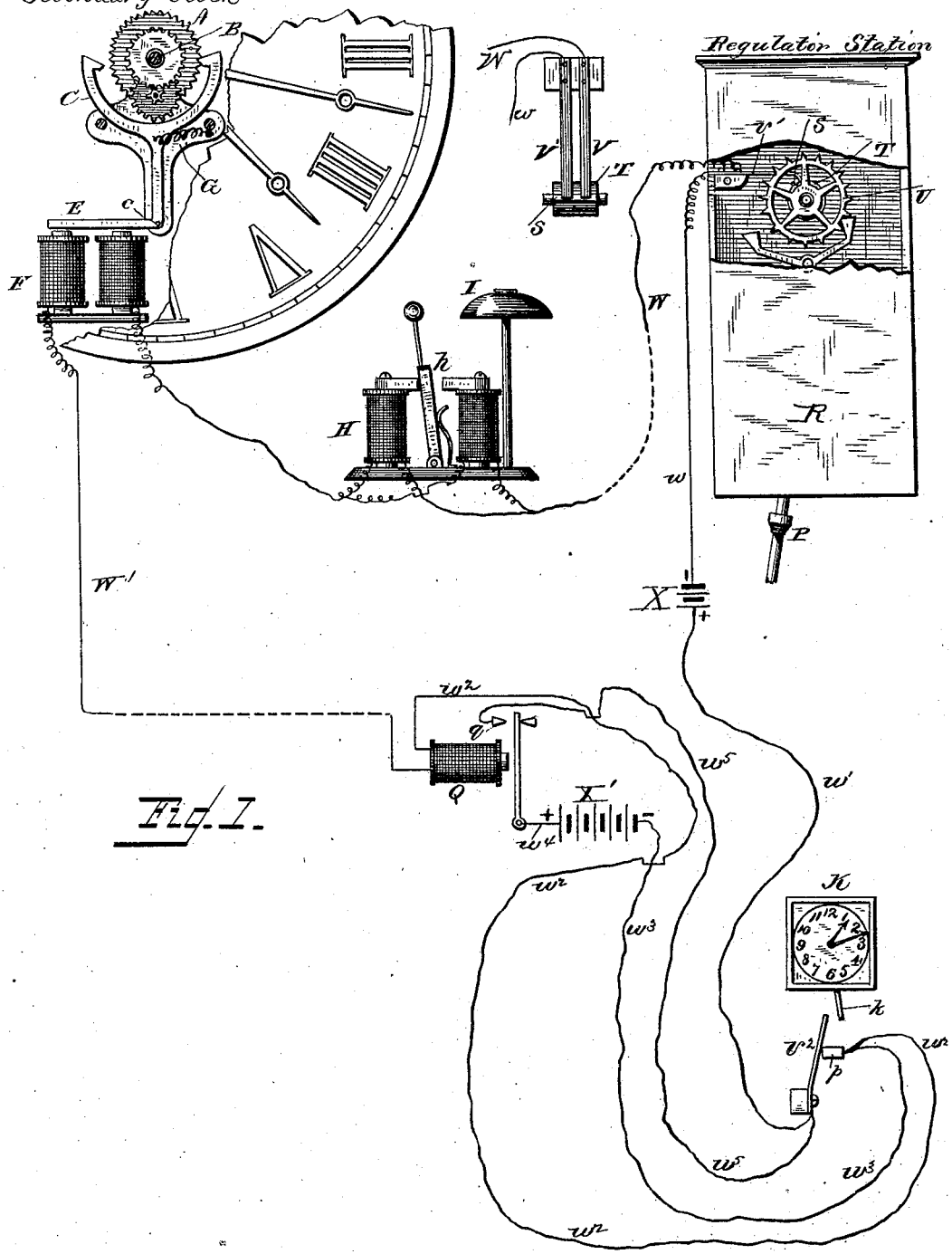

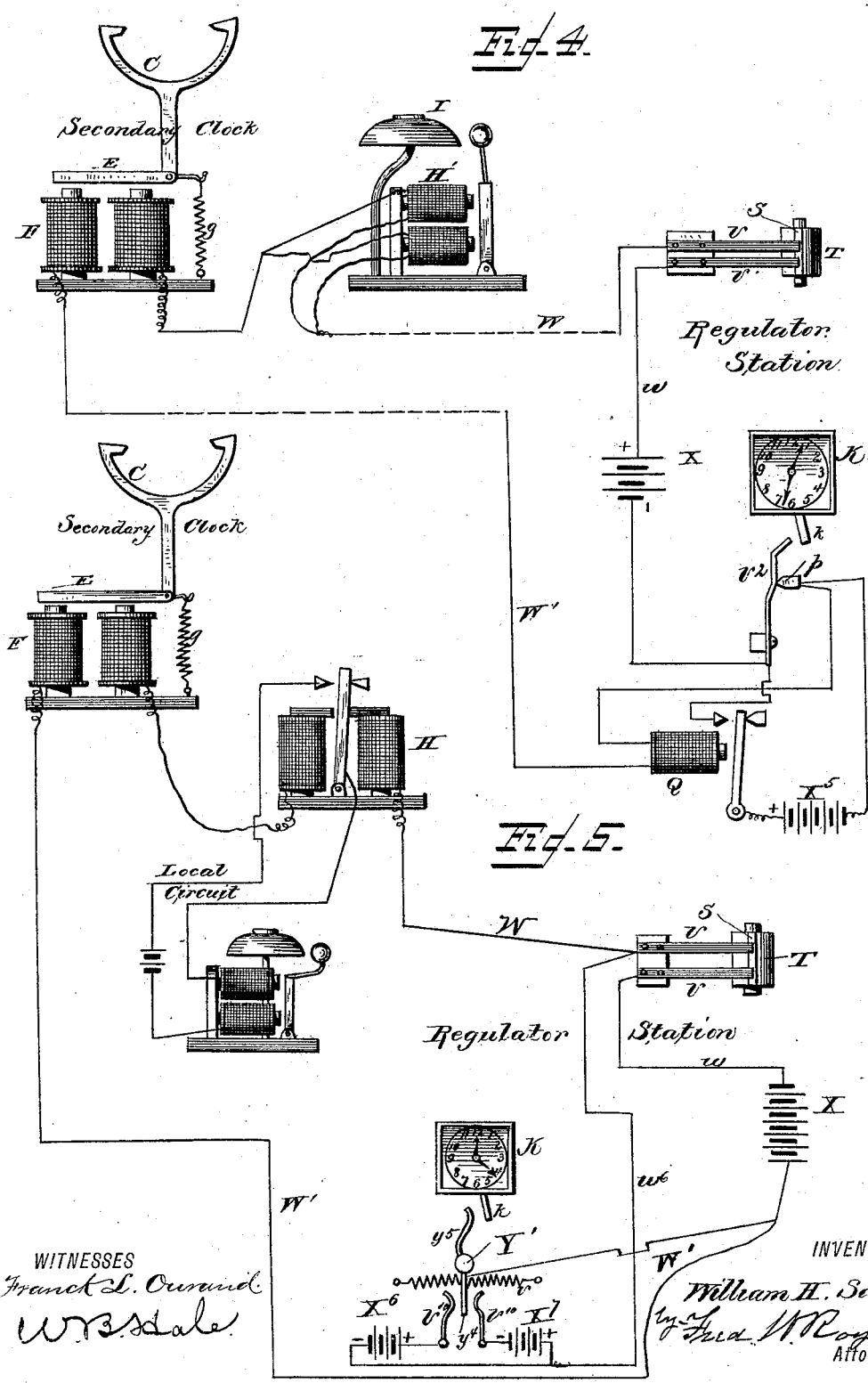

(No Model.)
4 Sheets—Sheet 4.
W. H. SAWYER.
STRIKE SYSTEM FOR SECONDARY ELECTRIC CLOCKS.
No. 295,287. Patented Mar. 18, 1884.
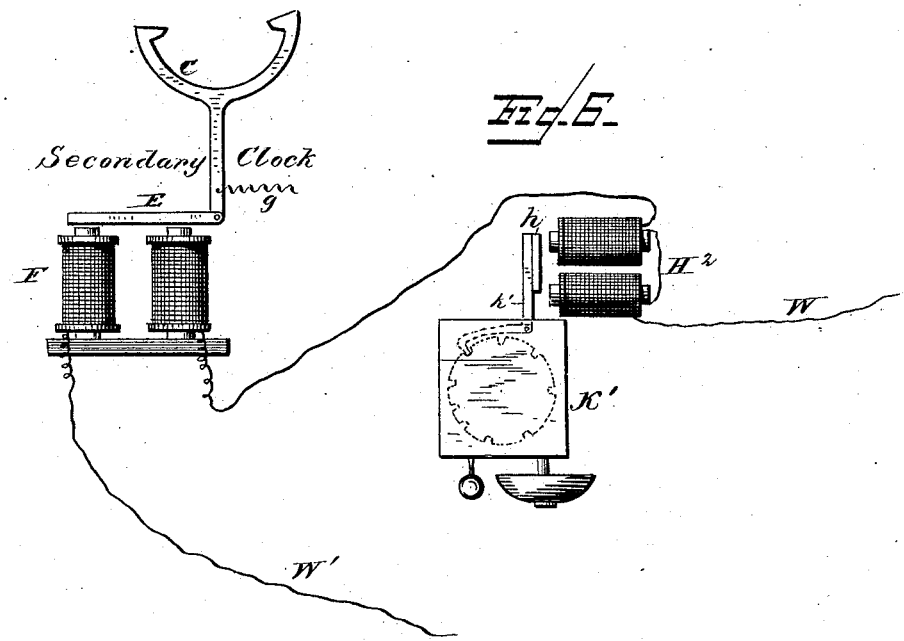
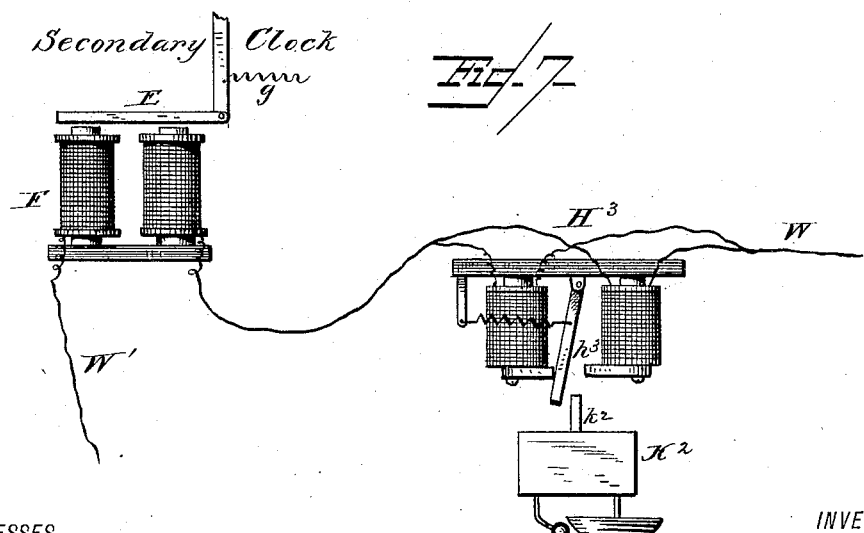
WITNESSES
Franck L. Ourand
W. B. Hale
INVENTOR
William H. Sawyer
by Fred. W. Royce
Attorney

UNITED STATES PATENT OFFICE.

WILLIAM H. SAWYER, OF PROVIDENCE, RHODE ISLAND.

STRIKE SYSTEM FOR SECONDARY ELECTRIC CLOCKS.

SPECIFICATION forming part of Letters Patent No. 295,287, dated March 18, 1884.

Application filed December 26, 1883. (No model.)

*To all whom it may concern:*

Be it known that I, WILLIAM H. SAWYER, a citizen of the United States, residing at Providence, in the county of Providence and State of Rhode Island, have invented certain new and useful Improvements in Electric Clocks; and I do hereby declare the following to be a full, clear, and exact description of the invention, such as will enable others skilled in the art to which it appertains to make and use the same.

My invention has for its object to provide for secondary or outlying electric clocks striking mechanism controlled from a central or regulator station independently of the dial mechanism; and with this object in view the invention consists in certain novel constructions and combinations of devices, which will be fully understood from the following particular description, in connection with the accompanying drawings, in which—

Figures 1, 2, 3, 4, 5, 6, and 7 are diagrams illustrating electric time systems having outlying or secondary clocks provided with hour-striking devices according to my invention.

Referring to Fig. 1, the regulator-station and a secondary clock are indicated by name. The regulator R in the present instance is shown as constructed to close the clock-circuit once every minute. It is unnecessary to describe all of its details of construction. Any electric regulating-clock might be used having means for closing the main circuit at predetermined intervals, one closing occurring at the end of each hour.

The secondary dial mechanism is such as shown in the Patent of A. S. Crane, No. 286,181, granted October 9, 1883. In this mechanism A is a spur-wheel with sixty teeth, inclined on both edges. The arbor B of this wheel is to be mounted in the frame in the usual manner and connected with the clock-hands by a simple train of wheel-work, which it is not necessary to illustrate, as its construction is well understood by those familiar with time mechanism.

C is an impelling-anchor, pivoted at c, and having connected to it a laterally-projecting armature, E, arranged to be attracted by an electro-magnet, F, and retracted by a spring, G. When a current passes through the magnet, it attracts the armature and causes the right-hand anchor-pallet to enter between two teeth of wheel A, moving said wheel a distance equal to half the space between the tips of two contiguous teeth. When the current ceases, the spring G will cause the left-hand pallet to act similarly on the wheel, so that by a closing and opening of a circuit including the magnet the wheel A will be caused to make one-sixtieth of a revolution; and if the circuit is closed and opened once a minute, the wheel will make one revolution in an hour, and carry a minute-hand around a dial step by step, indicating the minutes. The striking mechanism of this secondary clock comprises a polarized electro-magnet, H, having the tip of its armature-lever $h$ provided with a hammer-head to strike a bell, I. The polarized magnet H is in circuit with the dial-magnet F; but the normal direction of the current must be such as to cause the magnet F to operate the wheel A while the armature of magnet H remains unmoved. By sending over the line at the end of each hour a suitable number of reverse impulses, the polarized magnet may be caused to strike the bell to indicate the hours without interfering with the functions of magnet F, as the armature of the latter responds to a current in any direction. The sending of the reverse impulses is effected by causing the current of a stronger battery to overpower that of the regular dial-operating battery, and the placing of this stronger current on the line is accomplished by mechanism co-operating with but independent of the regulator at the central station, and which I will now describe.

The letter T designates a wheel, preferably of non-conducting material, fixed upon the shaft of a spur-wheel, U, which, in response to the action of the pendulum P and intermediate devices, makes one revolution every minute.

From the periphery of wheel T projects a metallic segment, S, which preferably has a length about equal to fifteen-sixtieths of the circumference of the said wheel; and V and V′ indicate two metallic spring-fingers insulated from each other and extending over the wheel T in such position that the segment S will make contact with both of them each time the wheel makes a complete revolution. One of the spring-fingers, V, is connected with a line-wire, W, which is connected with the secondary clock-magnet F through the polarized magnet H, and the other spring-finger, V', is connected by a wire, w, with the negative pole of a battery, X, which furnishes the current for operating the secondary clock mechanism. The positive pole of this battery is connected by a wire, w', with the fixed end of a metallic spring-finger, V², which lies normally in contact with a metal contact-pin, p, which is by a wire, w², connected with one terminal of the magnet of a relay, Q, having its other terminal connected by a line-wire, W', with the terminal of magnet F opposite that with which line-wire W is connected.

The letter X' indicates a battery having a sufficiently greater number of cells than battery X to be able to put upon the line a reverse current, which will overpower the current of battery X. The negative pole of this large battery X' is connected with the pin p by a wire, w³, and the positive pole is connected by a wire, w⁴, with the armature of the relay, the circuit-closing contact q of which is connected by a wire, w⁵, with spring-finger V².

The letter K indicates a spring striking mechanism, the striking-hammer k of which, instead of striking a bell, is arranged to strike the spring-finger V² in a proper direction to throw it out of contact with the pin p. This striking mechanism is constructed in an ordinary manner and tripped every hour by a time mechanism, so that it will strike the hours in regular order.

The operation of the system as now described is as follows: When the segment S is out of contact with fingers V and V', there is no current on the clock-circuit, and the armature of the secondary-clock magnet is retracted by spring G. At this time the current of the large battery X' is also broken by the relay. When the segment S comes in contact with the fingers, the circuit of battery X is closed and the secondary-clock magnet operates as before described; and when said segment passes out of contact with the finger the circuit is broken and the spring G operates the armature and anchor, as also before described. As the segment is fifteen-sixtieths of the circumference of the wheel T, the clock-circuit remains closed fifteen seconds, and during this time the relay holds closed the circuit of large battery X'; but the current of this battery will not flow on the main line so long as spring-finger V² is in contact with pin p, but flows over the shunt-circuit formed by wires w⁴, the relay-armature and contacts, wire w⁵, spring-finger V², pin p, and wire w³. Simultaneously with the coming of the segment S in contact with the fingers for the last time at the end of a regular hour, the striking mechanism K is operated to strike the number of the hour, and each time the hammer k strikes the spring-finger V² the shunt-circuit is broken and the large battery sends on the main line an impulse in opposition to the circuit of battery X, and for a brief time overpowers the said battery and causes the polarized magnet of the secondary clock-striking mechanism to strike its bell. It will be seen that when the shunt-circuit is broken the current of the large battery X' will flow over wire w⁴, the relay-armature and contacts, wire w⁵, wire w' through battery X in opposition to its current, over wire w, spring-finger V', segment S, spring-finger V, line-wire W, through polarized magnet H, secondary clock-magnet F, over line-wire W', through magnet of relay Q, over wire w², pin p, and wire w³, back to the negative pole of the battery. The reversals of the current on the line do not permit the armature of the secondary clock-magnet F to be retracted by its spring, because the change is so rapid that the spring does not have time to act after the current of battery X is neutralized before the magnet attracts its armature under the influence of the reverse impulse. The entire number of breakages of the shunt-circuit for striking the hour must of course occur during the time the clock-circuit is closed by the segment S. I find fifteen seconds to be ample time for the striking, and even a less time—say, ten seconds—would answer.

The relay Q might be omitted, and the wire w⁴ lead direct to spring-finger V²; but then the current of battery X' would continue to flow on the shunt-circuit except when it is broken by striking, and for economy I use what is called an "open-circuit battery," and keep it open three-fourths of each minute.

In the diagram Fig. 2 the parts of the regulator, except its circuit-closing wheel, are omitted, and the wire w, instead of leading directly to the clock-operating battery X³, leads to the metal arm z of a rock-shaft, Z, having an arm, z', arranged to be struck by hammer k of the striking mechanism K at the regulator-station, and is connected through this arm z, a spring, V³, with which it is normally in contact, and a wire, w⁶, to the positive pole of the battery, which has its negative pole connected with line-wire W'. Another spring, V⁴, stands on the opposite side of arm z from spring V³ and in position to be struck by said arm when hammer k performs its hourly striking operation, and rocks shaft Z by striking arm z'. This spring V⁴ is connected by a wire, w⁷, with the negative pole of a battery, X⁴, which has its positive pole connected with line-wire W'. The spring-finger V is connected with the secondary clock and its polarized striking-magnet the same as in Fig. 1. The operation is plain. The battery X³ furnishes the current for the ordinary operation of the secondary clock. When the striking mechanism K operates, its hammer makes contact alternately with spring V³ and V⁴, and thus the current on the line is intermittently reversed and the polarized magnet of the secondary clock caused to strike its bell.

In Fig. 3 I use a single battery, X⁸, for operating both the secondary-clock magnet and the polarized striking-magnet. Y is a rock-shaft, of non-conducting material, having a curved arm, $y$, projecting from about its middle, and two metallic arms, $y'$ and $y^2$, projecting radially from its opposite ends. On one side of each of these metallic arms is a spring, said springs being lettered $V^6$ and $V^7$, respectively, and connected with opposite poles of the battery $X^4$. Springs $V^8$ and $V^9$ stand on the other side of said arms, and are also connected to opposite poles of the battery, the springs $V^6$ and $V^9$ being connected to one pole and the other two springs to the other pole. A spring, $g$, holds the rock-shaft so that the metallic arms $y'$ and $y^2$ normally make contact with springs $V^6$ and $V^7$, and the arm $y$ stands in such position that when the striking mechanism K operates to strike the hours said arm $y$ will be struck by the hammer $k$ and the rock-shaft so turned that the arms $y'$ and $y^2$ will leave springs $V^6$ and $V^7$ and strike springs $V^8$ and $V^9$. The spring-finger $V'$ of the regulator is connected with metallic arm $y'$, and the line-wire $W'$ is connected with arm $y^2$. It will therefore be seen that as these metallic arms make and break contact with the opposite springs the current will be reversed on the clock-circuit, and the polarized striking-magnet of the secondary clock will strike its bell at each reversal, though the armature of magnet F will not be affected, because the reversals are so rapid, as before explained.

In Fig. 4, instead of using a polarized magnet for striking the bell at the secondary clock, I use an ordinary electro-magnet, H', so adjusted as to require a stronger current to operate its armature than is required to operate the dial-magnet F, and at the end of every hour I cause the striking mechanism at the regulator-station to connect an additional battery in circuit intermittently during the time the main circuit is closed for the last time in the hour. The battery $X^5$ is arranged in a normally-broken shunt controlled by a relay, as is large battery $X'$ in Fig. 1; but battery $X^5$ in this figure is arranged to send on the line impulses in the same direction as the current of battery X. When the segment S closes the clock-circuit for the last time in an hour, the striking mechanism at the regulator-station begins to act to strike the number of the hour just closing, and each time the hammer $k$ throws the spring-finger $V^2$ out of contact with pin $p$, the current of battery $X^5$, being deprived of the short circuit to flow over, adds an impulse to the current of battery X, the joint force of both batteries being sufficient to cause the operation of the striking-magnet at the secondary clock.

In the diagram Fig. 5 I have shown an arrangement by which the striking devices of the secondary clock are caused to operate while the circuit of the dial-operating battery is open, instead of while it is closed, as in the preceding figures. In this figure two small batteries, $X^6$ and $X^7$, are connected by a wire, $w^6$, with the spring-finger V, the negative pole of one and the positive pole of the other small battery being connected with said wire $w^6$, while their other poles are connected, respectively, with springs $V^{10}$ and $V^{11}$, standing on opposite sides of a metallic arm, $y^4$, which projects from a rock-shaft, Y', which is provided with a short arm, $y^5$, arranged to be struck by the hammer $k$ of the striking mechanism K at the regulator-station. The arm $y^4$ is connected with the line-wire W', and is held about midway between the springs $V^{10}$ and $V^{11}$ by two springs, $v\ v$. Neither of the small batteries $X^6\ X^7$ is strong enough to operate the dial-magnet F of the secondary clock; but the alternate placing of their currents on the line will cause the operation of the polarized striking-magnet H. The striking mechanism K at the regulator-station is so regulated that immediately after the closing and opening of the main-battery circuit for the last time in a regular hour the said striking mechanism will operate to strike the number of the hour. Each time the hammer $k$ strikes the arm $y^5$ the rock-shaft will be turned and the arm $y^4$ will make contact with spring $V^{10}$, and its rebound under the influence of one of the springs $v$, thus placed under tension, will cause it to make contact with spring $V^{11}$, the circuits of small batteries $X^6$ and $X^7$ being thus closed alternately and reversely to the main line, and the polarized magnet H being operated by the reversed currents. As will be readily understood, this polarized magnet might be arranged to act as a relay to close the circuit of a local battery through an ordinary electro-magnet arranged to strike a bell, as shown.

In the diagram Fig. 6 the secondary clock is provided with a mechanical spring striking mechanism, K', the tripping-arm $k'$ of which carries an armature, $h^2$, arranged to be attracted by an electro-magnet, $H^2$. This electro-magnet is adjusted to require a stronger current to operate it than is required to operate the dial-magnet. The circuits may be the same as shown in Fig. 2, but the striking mechanism at the regulator-station strikes only one stroke at the last closing of the main circuit, and thus adds one re-enforcing impulse to the current of the main battery, this being sufficient to cause the magnet H to trip the striking mechanism for striking the hour at the secondary clock.

In the diagram Fig. 7 a polarized electro-magnet, $H^3$, is used to trip the mechanical striking mechanism $K^2$ at the secondary clock by causing its armature $h^3$ to strike the tripping-lever $k^2$. The circuits may be as in either of the diagrams showing a polarized striking-magnet, but the central striking mechanism should be arranged to strike only one stroke at the close of each hour, and thus cause one reversal of current, such being sufficient to operate the polarized magnet and for tripping the striking mechanism of the secondary clock.

It will be readily understood that any convenient number of secondary clocks and striking-magnets for the same may be placed in the circuit, and the resistances and battery-force adjusted accordingly.

Having now fully described my invention and explained various modes of carrying it into practice, I claim—

1. In an electrical time system, the combination, with the main circuit and battery, a regulator arranged to close and break said circuit at predetermined intervals, and a secondary clock having its actuating electro-magnet included in said main circuit, of a striking device for said secondary clock, and a separate electro-magnet arranged in the main circuit for controlling said striking device, and requiring for its operation a variation of the current on the main circuit which will not operate the secondary-clock magnet, substantially as described.

2. In an electrical time system, the combination, with the main circuit and battery, a regulator at a central station arranged to close and break the main circuit at predetermined intervals, and a secondary electric clock having its actuating electro-magnet included in said main circuit, of a striking device for said secondary clock, an electro-magnet included in the main circuit for controlling said striking device, and requiring for its operation a variation of main-line current which will not affect the secondary-clock magnet, and devices at a central station arranged to act at predetermined intervals for producing the required variations of current on the main line, substantially as described.

3. In an electrical time system, the combination, with the main circuit and battery, a regulator at a central station arranged to close and break the main circuit at predetermined intervals, and a secondary electric clock having its actuating electro magnet included in the main circuit, of a polarized electro-magnet included in the main circuit and arranged to control a striking device, and mechanism at a central station arranged to cause reversals of current on the main line at predetermined intervals for operating said polarized electro-magnet, substantially as described.

4. In an electrical time system, the combination, with the main circuit and battery, a regulator at a central station arranged to close and break the main circuit at predetermined intervals, and a secondary electric clock having its actuating electro-magnet included in the main circuit, of a striking device for said secondary clock, a polarized electro-magnet included in the main circuit and arranged to control said striking device, an extra battery of greater strength than the regular secondary clock-operating battery, and devices for connecting said extra battery in the main circuit in opposition to the main battery, at predetermined intervals during the closing of the main-battery circuit, substantially as described.

In testimony whereof I affix hereto my signature in presence of two witnesses.

WILLIAM H. SAWYER.

Witnesses:
GILMAN E. JOPP,
WM. H. KENYON.